(No Model.) 3 Sheets—Sheet 3.
D. M. MOTHERWELL.
CULTIVATOR.
No. 604,172. Patented May 17, 1898.
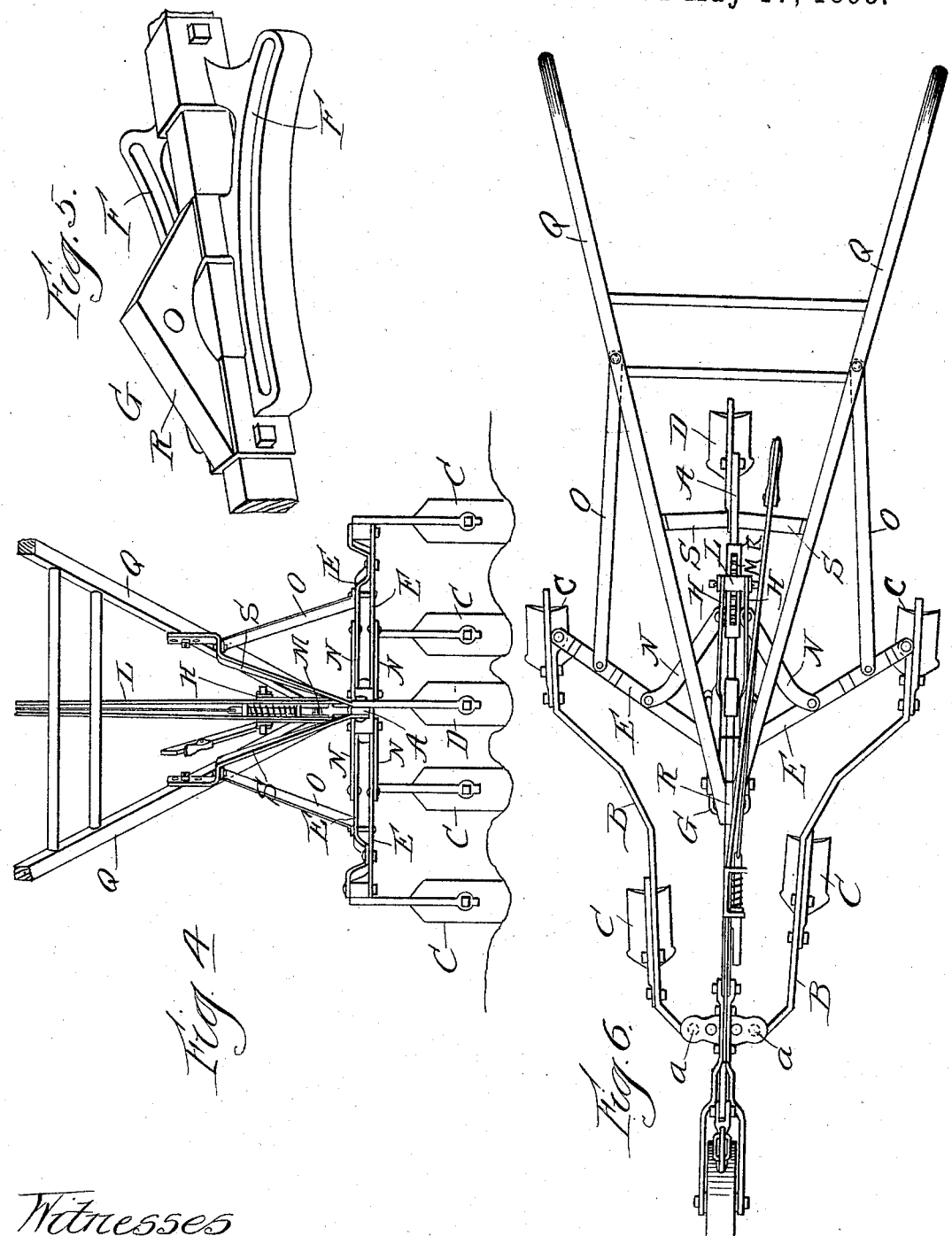
Witnesses
Wm. F. Henning
Wm. M. Rheem
Inventor
David M. Motherwell.
By Albert H. Bates, Atty.

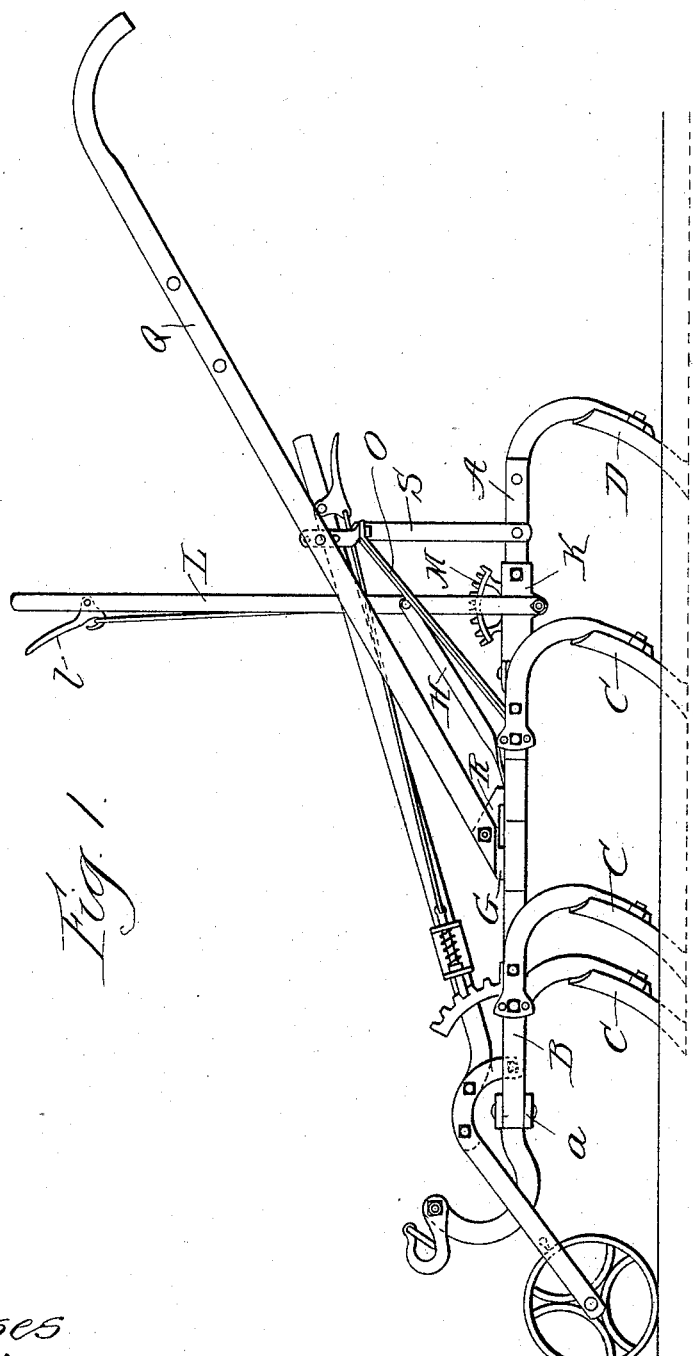

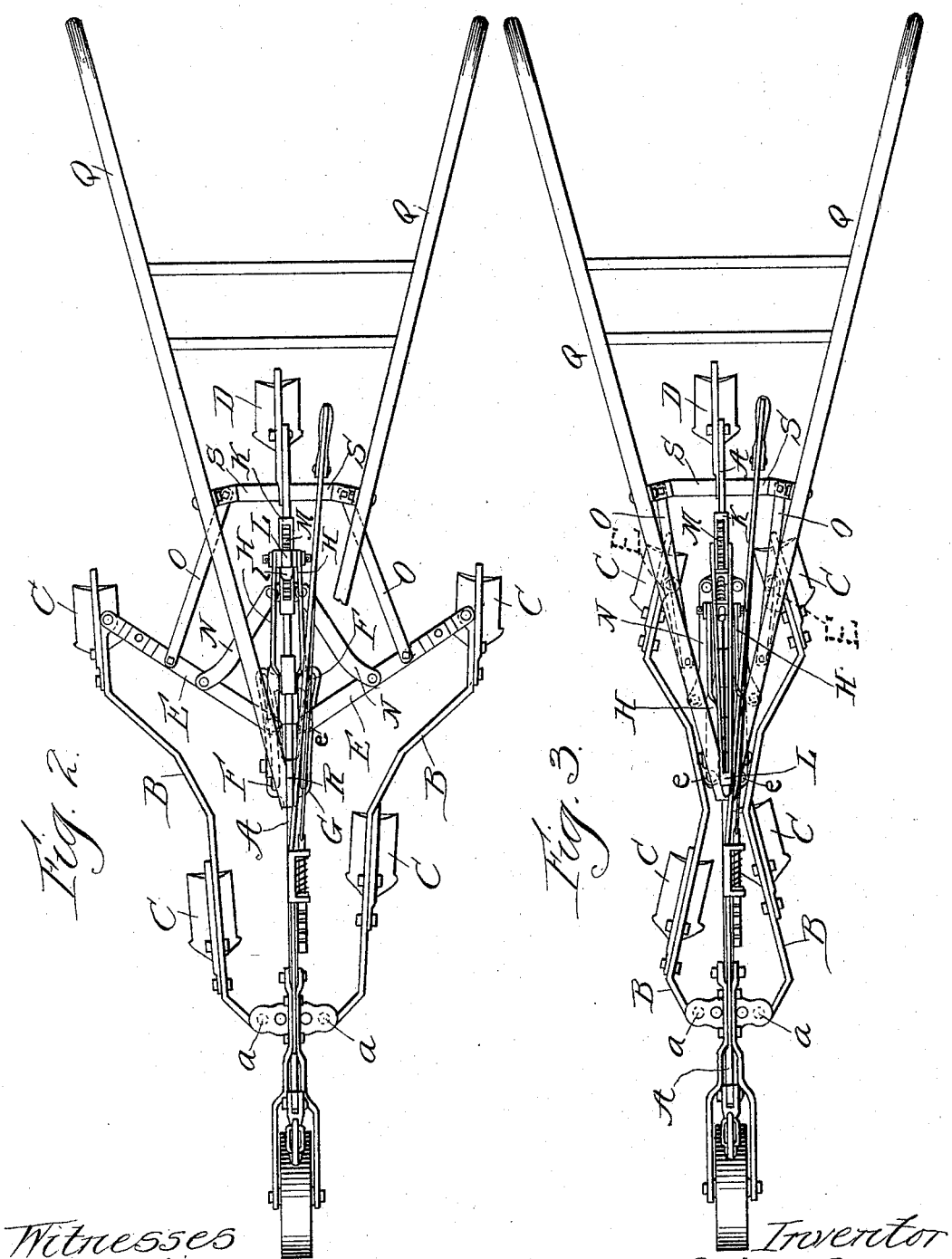

UNITED STATES PATENT OFFICE.

DAVID M. MOTHERWELL, OF CHICAGO, ILLINOIS, ASSIGNOR TO THE WHITMAN & BARNES MANUFACTURING COMPANY, OF AKRON, OHIO.

CULTIVATOR.

SPECIFICATION forming part of Letters Patent No. 604,172, dated May 17, 1898.

Application filed November 24, 1896. Serial No. 613,256. (No model.)

*To all whom it may concern:*

Be it known that I, DAVID M. MOTHERWELL, a citizen of the United States, and a resident of Chicago, in the county of Cook and State of Illinois, have invented a certain new and useful Improvement in Cultivators, of which the following is a specification.

My invention relates to cultivators. Its object is to supply to cultivators of the type which have adjustably-spreading side frames means adapted to efficiently spread the same and to rigidly hold them in desired position. Cultivators with spreading side frames are not new; but my invention contemplates the addition thereto of automatic braces which hold the side frames with great rigidity, while allowing a large amount of spread. I believe myself to be the first to invent a cultivator having braces automatically operating independently of the degree of spread.

The invention consists of a central bar and a pair of spreading side frames and links connecting the side frames and central bar and adapted to be moved, and thereby spread the side frames, in connection with brace-rods adapted to automatically brace the side frames whatever the amount of spread may be.

One part of my invention consists in the peculiar form of spreading device employed. The combinations of parts definitely pointed out in the claims also describe wherein the invention consists, and I do not wish to be understood as limiting myself to the form herein shown further than is specified in those claims.

The drawings show my preferred embodiment of the invention made in proportions which I have found to work satisfactorily.

Figure 1 is an elevation of a complete cultivator containing my invention. Figs. 2 and 3 are plans of the same, the former being in a condition well spread and the latter with the side frames closed up. Fig. 4 is an end view of the cultivator in the condition of spread shown in Fig. 2. Fig. 5 is a detail in perspective of the block forming the guide for the inner ends of the spreading links and for the attachment of the handle-bars. Fig. 6 is a plan of a cultivator in which one pair of the brace-rods are attached in a modified manner.

Hinged at $a$ to a central bar A are the side frames B. These side frames carry cultivator-teeth connected therewith in any desired manner. I find that two teeth on each side frame is a satisfactory disposition, though their number may of course be varied. I also prefer to attach a cultivator-tooth D to the rear of the central bar. Connecting the side frames with the central bar are the spreading links E. These links are preferably made of two bars, one above the other, the outer ends being pivoted to the side frames and the inner ends carrying a bolt $e$, passing through the slots F in the block G, which is secured to the central bar and which is preferably a malleable casting. If desired, in the place of the bolt sliding in a slot the inner ends of the links may be provided with eyes embracing a guide, or other means may be provided for establishing the sliding connection. Links H H connect the inner ends of the spreading links E E with the operating-lever L, which is hinged to the central bar by being pivoted to the casting K. This casting is bolted to the central bar and carries the notched segment M, preferably formed integral with it. On the operating-lever L is an ordinary finger-lever $l$, connecting with a spring-pressed dog, which engages with the notches in the segment. It is thus apparent that if the lever L is moved forward the links H H shove the inner ends of the spreading links E E forward, and thereby draw in the side frames, while if the lever is drawn backward the inner ends of the spreading links are also drawn backward and the side frames are spread. When the lever is locked in any position by means of the spring-pressed dog and the segment M, the side frames are thereupon locked in the corresponding position.

By making the slots in the block G flare outward to the rear of the machine I am enabled to obtain a larger amount of spread than can be secured when the inner end of the link E slides on or parallel to the central bar. This is an important point, and I believe myself to be the first to secure this additional amount of spread. It will be noticed that the embodiment of this feature does not interfere in the least with the compactness with which the cultivator may be closed, this compactness being obtained in a high degree.

In order that the teeth carried by the side frames may be held rigidly in their proper working position, it is necessary that these side frames be braced. For the efficient accomplishment of this I provide two pairs of braces N N and O O. I prefer to use both of these, but the cultivator would operate, though less advantageously, with but one pair. The removal of both pairs would not interfere with the spreading, as these braces are not instrumental in spreading, though such a construction would not possess the desired rigidity. By making the slots in the block G curves concaving outward in addition to flaring rearward, as shown, I endow the links E with such a motion when they operate that there is a point upon the link E which travels in substantially the arc of a circle about a point on the central bar or on the casting K, bolted thereon. The braces N N connect these two points, being pivoted to the links E and to ears on the casting K, and thereby brace the cultivator in whatever condition of spread it may be. Projecting upward from the rear of the central bar are struts S. Bolted to these struts and to the lug R, which projects upward from the block G, are the handle-bars Q. These handle-bars, together with their cross-rods and the struts S, I designate, for convenience, the "handle-frame." The spreading link E as it travels in the path which the nature of its attachment compels it to follow has also a point which travels in substantially the arc of a circle about a point on the handle-frame. This latter point may be either upon the struts supporting the handle-bars or upon the handle-bars themselves. The brace-rods O O connect these points on the spreading links E E with the correlative points on the handle-frame. The curve which the forward end of the brace-rod O follows is accurately described as "substantially the arc of a circle," and if the proper proportions are employed in constructing the cultivator this curve will very closely approach an arc of a mathematically true plane circle. The arc, while a constant distance from the rear of the brace-rod, does, in fact, bend slightly from the horizontal plane which the spreading link would otherwise occupy, so that the side frames slightly rise and fall as they are spread. This rising and falling is not only so small as to be immaterial, but if the points are properly chosen is hardly detectable; but as the advantages of this invention would to some extent be obtained if there were quite a rising or falling of the side frames I do not intend to limit myself to an arc of a plane circle, and to emphasize this I will speak of the arc as a "curve" on the surface of a sphere.

In Figs. 1 to 4 the rear ends of the brace-rods O O are pivoted to the struts, and such connection has the advantage that the handle-bars, which are preferably adjustably bolted to the struts, may be raised or lowered without changing the pivot of the brace-rod. In Fig. 6 the pivot-point is slightly varied when the handle-bars are raised or lowered. This variation, however, is not sufficient to prevent the practical working of the brace-rod, as the arc whose center is at the forward bolt of the handle-bars, about which the handle-bars are raised or lowered, does not diverge greatly for the short distance of movement from the arc whose center is the inner pivot of the brace-rod O. Either form of brace has its advantages, and I do not desire to be understood as limiting myself to any particular points of attachment of the brace-rods so long as the essential method of operation is obtained.

The pivoted braces extending from the handles to the swinging links, being included in an earlier application filed by me, are reserved for such application.

Having thus described my invention, what I claim, and desire to secure by Letters Patent, is—

1. In a cultivator, a central bar, a handle-frame extending therefrom, a pair of side frames adjustable toward and from said central bar, a pair of spreading links connected at their outer ends to said side frames, the guides for the inner ends of said links curved outwardly and rearwardly, in combination with braces connecting said links with stationary points, for the purpose specified.

2. In a cultivator, a central bar, a handle-frame extending therefrom, a pair of side frames adjustable toward and from said central bar, a pair of spreading links connected at their outer ends to said side frames and having their inner ends guided in curved paths, in combination with means for causing said inner ends to move in the said paths and for locking them in desired position therein, and braces connecting said links with stationary points, for the purpose specified.

3. In a cultivator, in combination, a central bar, a handle-frame extending therefrom, a pair of side frames adjustable toward and from said central bar, a pair of links connected at one end with the side frames and having their other ends guided in a curve flaring outwardly as it extends rearwardly, links connecting said spreading links with an operating-lever and means for locking the operating-lever in desired points, for the purpose specified.

4. In a cultivator, in combination, a central bar, a pair of side frames adjustable toward and from said central bar, a spreading device having rigid links connecting said side frames with the central bar and adapted to spread the side frames while keeping them in substantially the same plane of elevation and without flexion in said links, and brace-rods connected to the central bar by fixed pivots and pivotally connected to the spreading device at points intermediate of the ends of said links which move substantially in the arc of a circle about such fixed points, for the purposes specified.

5. In a cultivator, in combination, a central bar, a side frame adjustable toward and from said central bar, a spreading link connected to said side frame and to a link leading to an operating-lever, and guides curved outwardly and rearwardly, for the purposes specified.

6. In a cultivator, in combination, a central bar, a pair of side frames adjustable toward and from said central bar, a pair of links connecting the side frames and central bar and having their inner ends guided by a block secured to the central bar in paths flaring rearwardly and means for moving the links, for the purpose specified.

7. In a cultivator, in combination, a central bar, a pair of side frames adjustably connected therewith, a pair of spreading links connecting said side frames with said central bar, the inner ends of said links sliding in paths diverging from the central bar, an operating-lever mounted on the central bar and a pair of links each pivoted at one end to the operating-lever and connected at the other end to the spreading link, for the purpose specified.

8. In a cultivator, in combination, a central bar, a pair of side frames adjustably connected therewith, a pair of spreading links connecting said side frames with said central bar, each of said links consisting of two bars one above the other, the inner ends of said bars being connected together by a bolt which passes through a slot in a piece secured to the central bar, an operating-lever and a link connecting the lever and the bolt, for the purpose specified.

9. In a cultivator, the combination with a central bar of a block having guides curved outwardly and rearwardly, for the purpose specified.

10. In a cultivator in combination with the central bar, a block having flaring slots and an upwardly-extending lug, spreading links pivotally mounted in said slots and extending rigidly to and pivotally connected with the side frames of the cultivator, and handle-bars attached at their lower ends to the lug upon said block, substantially as and for the purposes specified.

DAVID M. MOTHERWELL.

Witnesses:
H. G. MILLIMAN,
E. J. ENNIS.